US012155760B2

(12) United States Patent
Shah et al.

(10) Patent No.: US 12,155,760 B2
(45) Date of Patent: Nov. 26, 2024

(54) NETWORK TIMING SYNCHRONIZATION

(71) Applicant: Apple Inc., Cupertino, CA (US)

(72) Inventors: Birju N. Shah, Redwood City, CA (US); Tristan F. Schaap, San Francisco, CA (US); James E. Zmuda, Redwood City, CA (US); Manfred von Willich, Encinitas, CA (US)

(73) Assignee: Apple Inc., Cupertino, CA (US)

(*) Notice: Subject to any disclaimer, the term of this patent is extended or adjusted under 35 U.S.C. 154(b) by 124 days.

(21) Appl. No.: 17/937,659

(22) Filed: Oct. 3, 2022

(65) Prior Publication Data

US 2023/0028255 A1 Jan. 26, 2023

Related U.S. Application Data

(62) Division of application No. 16/329,743, filed as application No. PCT/US2017/050817 on Sep. 8, 2017, now Pat. No. 11,463,253.

(Continued)

(51) Int. Cl.
*H04L 9/12* (2006.01)
*G06F 21/64* (2013.01)
(Continued)

(52) U.S. Cl.
CPC ............... *H04L 9/12* (2013.01); *G06F 21/64* (2013.01); *H04J 3/0667* (2013.01);
(Continued)

(58) Field of Classification Search
CPC ........................................................ H04L 9/12
(Continued)

(56) References Cited

U.S. PATENT DOCUMENTS 8,453,240 B2 5/2013 Lagimonier et al.
8,959,346 B2 2/2015 Agrawal
(Continued)

FOREIGN PATENT DOCUMENTS

CN 1826742 A 8/2006
CN 102739626 A 10/2012
(Continued)

OTHER PUBLICATIONS

International Search Report and Written Opinion in Appl. No. PCT/US2017/050817 mailed Mar. 12, 2018, 20 pages.
(Continued)

*Primary Examiner* — Lihong Yu
(74) *Attorney, Agent, or Firm* — Kowert, Hood, Munyon, Rankin & Goetzel, P.C.; Paul T. Seegers; Dean M. Munyon

(57) ABSTRACT

Techniques are disclosed relating to time synchronization in a network. In some embodiments, an apparatus includes a first circuit having a first clock configured to maintain a local time value for a node coupled to a network. The first circuit is configured to send a first message to a second circuit. The first message includes a first nonce. The second circuit has a second clock that maintains a reference time value for the network. The first circuit receives a second message from the second circuit, the second message including a second nonce and is associated with a timestamp identifying the reference time value. The first circuit compares the first nonce to the second nonce to determine whether the timestamp is valid and, in response to determining that the timestamp is valid, uses the timestamp to synchronize the first clock with the second clock.

20 Claims, 12 Drawing Sheets

Related U.S. Application Data

(60) Provisional application No. 62/399,313, filed on Sep. 23, 2016.

(51) Int. Cl.

| | | |
|---|---|---|
| *H04J 3/06* | (2006.01) | |
| *H04L 7/00* | (2006.01) | |
| *H04L 9/00* | (2022.01) | |
| *H04L 9/32* | (2006.01) | |
| *H04L 9/40* | (2022.01) | |

(52) U.S. Cl.
CPC .............. *H04L 7/0012* (2013.01); *H04L 9/00* (2013.01); *H04L 9/3234* (2013.01); *H04L 9/3242* (2013.01); *H04L 63/00* (2013.01); *H04L 63/123* (2013.01); *G06F 2221/2151* (2013.01); *H04L 2209/12* (2013.01)

(58) Field of Classification Search
USPC .......................................................... 380/255
See application file for complete search history.

(56) References Cited

U.S. PATENT DOCUMENTS

| | | | |
|---|---|---|---|
| 9,208,339 B1 | 12/2015 | Paczkowski et al. | |
| 9,549,319 B1 | 1/2017 | Butler et al. | |
| 9,553,843 B1 | 1/2017 | Smith et al. | |
| 9,667,370 B2 | 5/2017 | Tzeng et al. | |
| 2006/0146815 A1 | 7/2006 | Tse | |
| 2010/0085963 A1* | 4/2010 | Bekiares | H04L 65/80 |
| | | | 370/389 |
| 2010/0223399 A1 | 9/2010 | Kim et al. | |
| 2010/0313012 A1* | 12/2010 | Pang | H04L 9/321 |
| | | | 713/155 |
| 2011/0098954 A1 | 4/2011 | Falk et al. | |
| 2012/0020417 A1* | 1/2012 | Wei | H04L 7/041 |
| | | | 375/259 |
| 2013/0145429 A1 | 6/2013 | Mendel et al. | |
| 2016/0063220 A1* | 3/2016 | Vlot | H04L 63/123 |
| | | | 726/29 |
| 2016/0315756 A1 | 10/2016 | Tenea et al. | |

FOREIGN PATENT DOCUMENTS

| | | |
|---|---|---|
| DE | 102014214823 | 2/2016 |
| DE | 102014217993 | 3/2016 |
| EP | 2490357 | 8/2012 |
| EP | 2600585 | 6/2013 |
| JP | 09-046325 | 2/1997 |
| JP | 2008-244609 | 10/2008 |

OTHER PUBLICATIONS

Markus Ullmann, et al., "Delay Attacks—Implication on NTP and PTP Time Synchronization," ISPCS 2009 International EEE Symposium on Precision Clock Synchronization for Measurement, Control and Communication, Oct. 12-16, 2009, 6 pages.

Kevin B. Stanton, 802.1AS Tutorial, Intel Corporation, Nov. 13, 2008, 42, pages.

Examination Report in Australian Appl. No. 2017332620 mailed Nov. 6, 2019, 3 pages.

Office Action in Japanese Appl. No. 2019-511779 mailed Mar. 16, 2020, 5 pages.

D.Sibold et al., "Network Time Security, draft-ietf-ntp-network-time-security-14," Mar. 21, 2016, URL: https://tools.ietf.org/pdf/draft-ietf-ntp-network-time-security-14.pdf (Mar. 2016), 40 pages.

Elena Lisova et al., "Protecting Clock Synchronization: Adversary Detection through Network Monitoring," Journal of Electrical and Computer Engineering, Hindawi Publishing Corporation, Apr. 2016, URL: https://www.hindawi.com/journals/jece/2016/6297476, 16 pages.

Office Action in CN Appl. No. 201780052633.9 mailed Mar. 3, 2020, 12 pages.

Examination Report in Australian Appl. No. 2017332620 mailed Apr. 21, 2020, 6 pages.

\* cited by examiner

Sync Message 300

| Bits | | | | | | | | Octets |
|---|---|---|---|---|---|---|---|---|
| 7 | 6 | 5 | 4 | 3 | 2 | 1 | 0 | |
| Header | | | | | | | | 34 |
| Reserved | | | | | | | | 10 |
| slaveNonce TLV | | | | | | | | ~10 |
| ICV TLV | | | | | | | | ~30 |

FIG. 3A

Sync Follow-Up 350

| Bits | | | | | | | | Octets |
|---|---|---|---|---|---|---|---|---|
| 7 | 6 | 5 | 4 | 3 | 2 | 1 | 0 | |
| Header | | | | | | | | 34 |
| preciseOriginTimestamp | | | | | | | | 10 |
| Follow_Up Information TLV | | | | | | | | 34 |
| slaveNonce TLV | | | | | | | | ~10 |
| ICV TLV | | | | | | | | ~30 |

FIG. 3B

Pdelay Request 400A

| Bits | | | | | | | | Octets |
|---|---|---|---|---|---|---|---|---|
| 7 | 6 | 5 | 4 | 3 | 2 | 1 | 0 | |
| Header | | | | | | | | 34 |
| Reserved | | | | | | | | 10 |
| Reserved | | | | | | | | 10 |
| slaveNonce TLV | | | | | | | | ~10 |
| ICV TLV | | | | | | | | ~30 |

Pdelay Request 400B

| Bits | | | | | | | | Octets |
|---|---|---|---|---|---|---|---|---|
| 7 | 6 | 5 | 4 | 3 | 2 | 1 | 0 | |
| Header | | | | | | | | 34 |
| Reserved | | | | | | | | 10 |
| Reserved | | | | | | | | 10 |
| slaveNonce TLV | | | | | | | | ~10 |

FIG. 4A

Pdelay
Follow-Up
460A

| Bits | | | | | | | | Octets |
|---|---|---|---|---|---|---|---|---|
| 7 | 6 | 5 | 4 | 3 | 2 | 1 | 0 | |
| Header | | | | | | | | 34 |
| responseOriginTimestamp | | | | | | | | 10 |
| requestingPortIdentity | | | | | | | | 10 |
| ICV TLV | | | | | | | | ~30 |

Pdelay
Follow-Up
460B

| Bits | | | | | | | | Octets |
|---|---|---|---|---|---|---|---|---|
| 7 | 6 | 5 | 4 | 3 | 2 | 1 | 0 | |
| Header | | | | | | | | 34 |
| responseOriginTimestamp | | | | | | | | 10 |
| requestingPortIdentity | | | | | | | | 10 |
| slaveNonce TLV | | | | | | | | ~10 |
| masterNonce TLV | | | | | | | | ~10 |
| ICV TLV | | | | | | | | ~30 |

FIG. 4C

Integrity Check Value (ICV) Field 500

| Bits | | | | | | | | Octets |
|---|---|---|---|---|---|---|---|---|
| 7 | 6 | 5 | 4 | 3 | 2 | 1 | 0 | |
| tlvType = AUTHENTICATION | | | | | | | | 2 |
| lengthField | | | | | | | | 2 |
| lifetimeId | | | | | | | | 2 |
| replayCounter | | | | | | | | 4 |
| keyId | | | | | | | | 2 |
| algorithmId | | | | | | | | 1 |
| Reserved | | | | | | | | 1 |
| Pad | | | | | | | | M |
| ICV (Integrity Check Value) | | | | | | | | N |

Nonce Field 600

| Bits | | | | | | | | Octets |
|---|---|---|---|---|---|---|---|---|
| 7 | 6 | 5 | 4 | 3 | 2 | 1 | 0 | |
| tlvType = NONCE_SLAVE or NONCE_MASTER | | | | | | | | 2 |
| lengthField | | | | | | | | 2 |
| nonceCount | | | | | | | | 2 |
| Nonce | | | | | | | | ~4 |

NETWORK TIMING SYNCHRONIZATION

PRIORITY INFORMATION

The present application is a divisional of U.S. application Ser. No. 16/329,743, entitled "NETWORK TIMING SYNCHRONIZATION," filed Feb. 28, 2019 (now U.S. Pat. No. 11,463,253), which is a National Stage Entry of PCT/US17/50817, entitled "NETWORK TIMING SYNCHRONIZATION," filed Sep. 8, 2017, which claims priority to U.S. provisional Appl. No. 62/399,313, entitled "NETWORK TIMING SYNCHRONIZATION," filed Sep. 23, 2016; the disclosures of each of the above-referenced applications are incorporated by reference herein in their entireties.

BACKGROUND

Technical Field

This disclosure relates generally to computing devices, and, more specifically, to synchronizing time among multiple devices communicating over a network.

Description of the Related Art

Various protocols have been developed to synchronize computers clocks over a computer network. In many instances, a protocol may facilitate distributing timing information provided from a source that maintains a master clock such as the atomic clock at the U.S. Naval Observatory. For example, one of the most notable protocols is the network time protocol (NTP) used to synchronize time among computers connected to the Internet. The timing information received via this protocol may be used to not only to display time on a user's computer, but also coordinate performance of various operations such as distributing software updates to computers, displaying notifications, invoking a backup utility, time stamping emails, etc. As timing demands have changed, other network protocols have been developed to enable more precise time synchronization. For example, IEEE 802.1AS may be used in various audio and video applications to synchronize time among devices that are consuming or producing audio and video content.

SUMMARY

The present disclosure describes embodiments in which time is synchronized between nodes in a network. In various embodiments, an apparatus includes a first circuit having a first clock configured to maintain a local time value for a node coupled to a network. The first circuit is configured to send a first message including a first nonce to a second circuit that maintains a reference time value for the network. The first circuit receives, from the second circuit, a second message including a second nonce and associated with a timestamp identifying the reference time value. The first circuit compares the first nonce to the second nonce to determine whether the timestamp is valid and, in response to determining that the timestamp is valid, uses the timestamp to synchronize the first clock with the second clock. In some embodiments, the first circuit sends the first message during an exchange with the second circuit to determine a propagation delay between the first circuit and the second circuit, and uses the timestamp to synchronize the first clock with the second clock by determining an offset between the first clock and the second clock based on the propagation delay and the timestamp.

BRIEF DESCRIPTION OF THE DRAWINGS

FIGS. 3A and 3B are diagrams illustrating examples of messages in a synchronization communication.

FIGS. 4A-4C are diagrams illustrating examples of messages in a propagation delay exchange.

Figure 1:
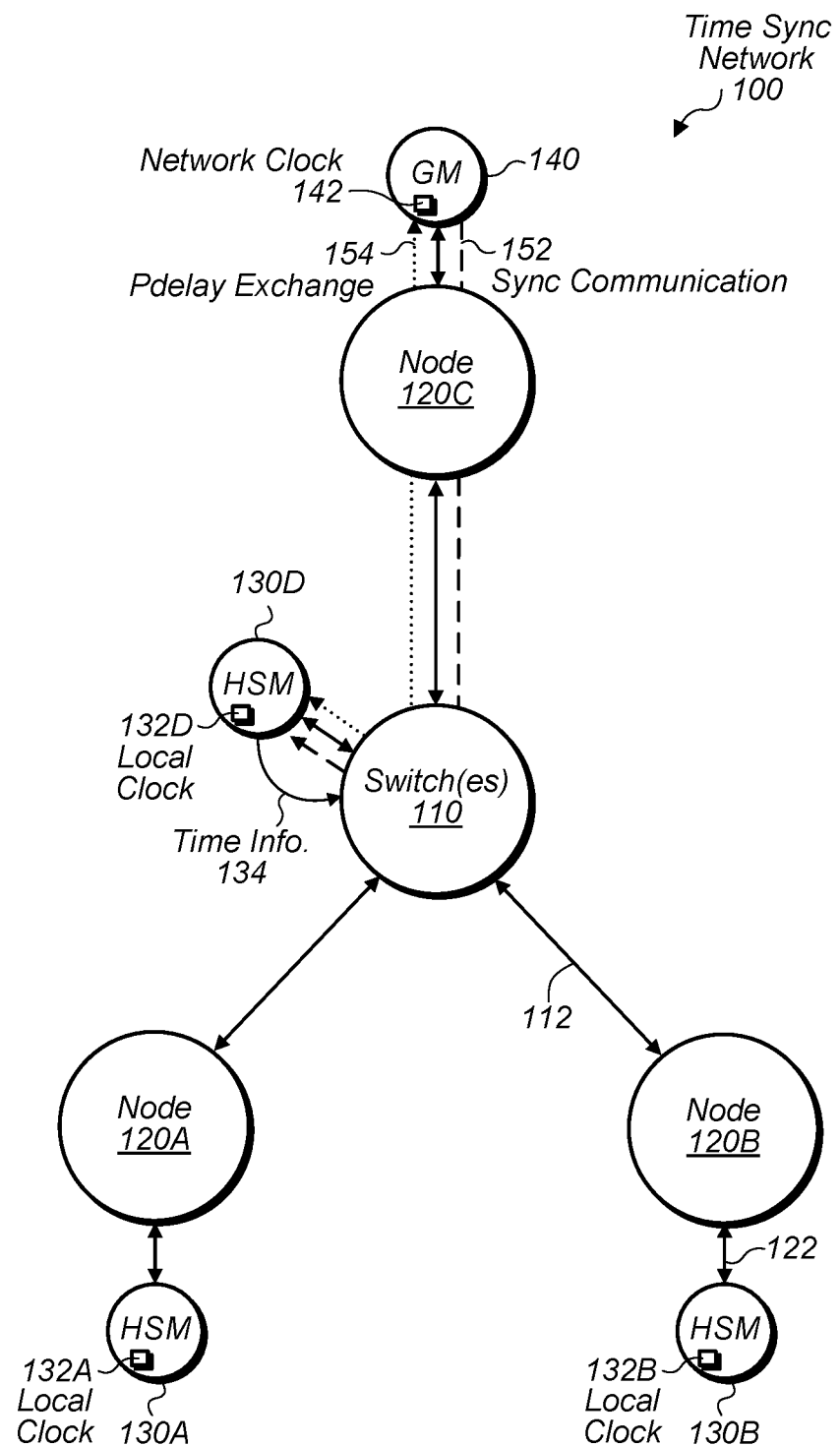
FIG. 1 is a block diagram illustrating an example of a network that implements time synchronization.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "node configured to communicate traffic over a network" is intended to cover, for example, a device that has circuitry that performs this function during operation, even if the device in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f)

during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, an exchange between a first circuit and a second circuit may include the communication of multiple messages. The terms "first" and "second" can be used to refer to any two of messages in the exchange. In other words, the "first" and "second" messages are not limited to the initial two messages in the exchange, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the term "synchronize" refers to calculating, for a first clock, an adjustment to be made to the first clock to determine the value of a second clock. While this term encompasses adjusting the value in the first clock to have the same time as the second clock, this term, for the sake of this disclosure, also encompasses not adjusting the value in the first clock. For example, "synchronizing" a first clock with a second clock may include calculating an adjustment for the first clock and applying the adjustment to a time value output by the first clock in order to determine a time value of the second clock.

DETAILED DESCRIPTION

A problem with traditional time synchronization schemes is that they typically do not take security concerns into consideration. This design failure may allow a malicious person to potentially interfere with a computing device's perception of the current time. For example, the person may attempt to spoof a trusted time source by providing a message announcing an incorrect time. The person might also attempt to a replay message after a delay and have the recipient consider the replayed messages as being fresh (e.g., replaying the message with a delay that corresponds to the receiver's offset clock). In doing so, the person may be able to interfere with scheduled operations performed by the device and potentially cause other problems.

The present disclosure describes various techniques for improving the security of a time synchronization system. In various embodiments described below, a computer network implements a protocol for managing clock synchronization among network nodes having respective local clocks. This protocol may be used to periodically announce the current time of a network clock via communicating a first set of one or more messages from a master clock to a slave clock as well as determine offsets between the clocks via communicating a second set of messages in order to account for the propagation delays introduced by the network in distributing the announced current time. To improve the security of these messages, in some embodiments, an integrity check value (ICV) is added to each message. As used herein, the term "integrity check value" is to be interpreted according to its understood meaning in the art, and includes a value that is usable to verify the integrity of data and calculated by applying a keyed function (i.e., a function that uses a cryptographic key) to the data. Inclusion of this value may allow messages to be authenticated and resistant to tampering by a malicious entity. In some embodiments, one or more nonces are included in an exchange that is used to determine a propagation delay and then repeated in a subsequent announcement of the current time. As used herein, the term "nonce" is to be interpreted according to its understood meaning in the art, and includes an arbitrary and unpredictable number that is only used once in an operation or a set of operations. For example, a nonce may be determined using a random or pseudo random number generator algorithm. Inclusion of a nonce in this manner may prevent older announcements from being replayed by a malicious entity attempting to interfere with a node's local time. In some embodiments, a network node may collect information for determining a propagation delay that is also usable to determine an expected offset between a local clock and the network clock. The node may then compare this expected offset with an offset calculated from a timestamp identifying the current time in a subsequent announcement. If the expected offset differs significantly from the calculated offset, the node may discard the announcement as it may be illegitimate.

In some embodiments, messages associated with time synchronization may also be processed by secure circuits coupled to network nodes using the timing information (as opposed to the nodes themselves handling the processing). As used herein, the term "secure circuit" refers to a circuit that protects an isolated, internal resource from being directly accessed by an external entity. As will be described below, in various embodiments, a secure circuit may maintain the local clock for a network node and keys used to generate or verify ICVs included in messages. In some instances, using secure circuits to process messages (as opposed to the nodes) may provide additional security to the network.

Figure 2:
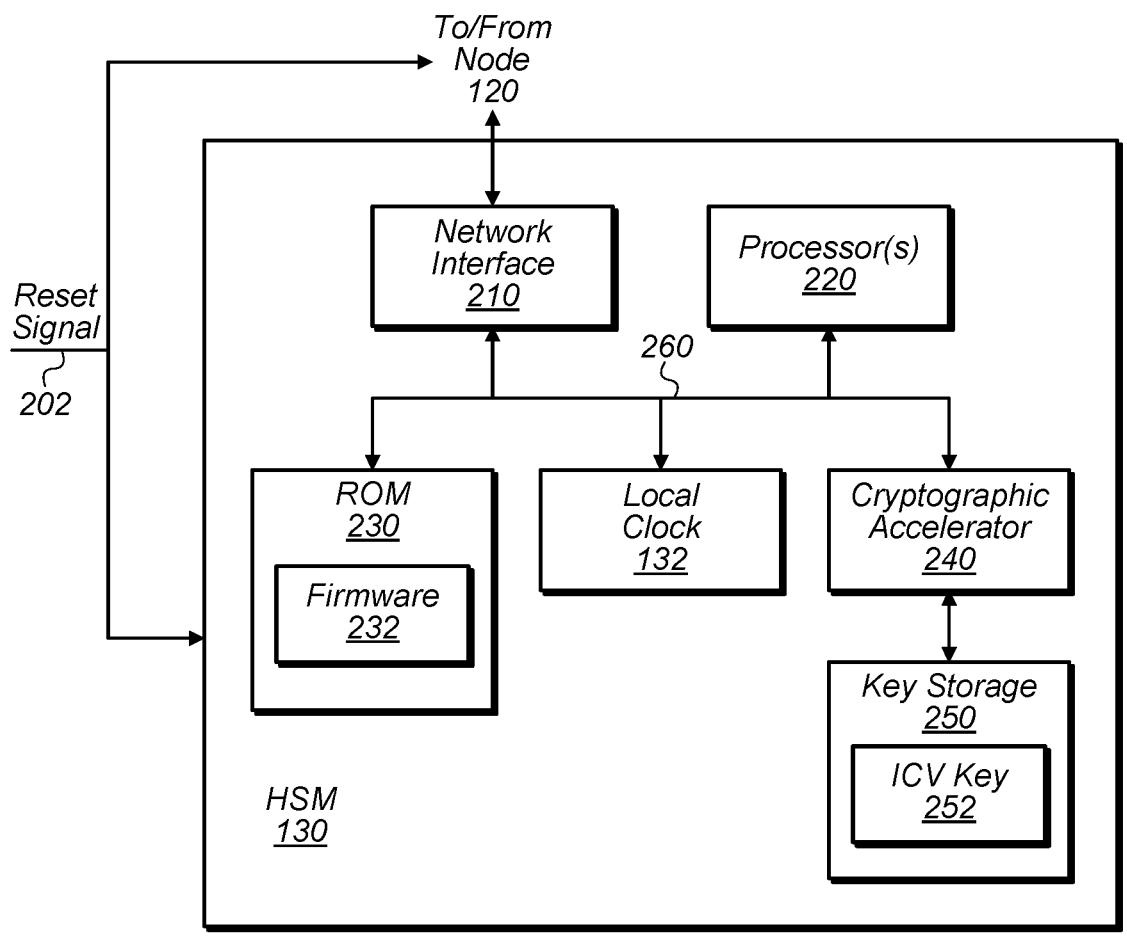
FIG. 2 is a block diagram illustrating an example of a hardware security module configured to facilitate time synchronization.

The present disclosure begins with a description of components in a secure network that implements time synchronization in conjunction with FIGS. 1 and 2. Network communications between nodes are described with respect to FIGS. 3A-7B. Methods performed by network components are described with respect to FIGS. 8-9B. Lastly, an exemplary computer system that may be used to implement one or more network components is discussed with FIG. 10.

Turning now to FIG. 1, a block diagram of a network 100 configured to implement time synchronization is depicted. In the illustrated embodiment, network 100 includes a switch 110 coupled to multiple nodes 120A-C via links 112. Nodes 120A-B, in turn, are coupled via links 122 to respective hardware security modules (HSMs) 130A-B, which include local clocks 132A-B. As shown, node 120C is coupled to a grand master (GM) 140, which includes a network clock 142. Switch 110 is also coupled to an HSM 130D, which includes a local clock 132D. In various embodiments, network 100 may be implemented differently than shown. Accordingly, in some embodiments, more (or less) switches 110 and/or nodes 120 may be present. In some embodiments, GM 140 may be coupled to a switch 110 (as opposed to a node 120). In some embodiments, functionality described herein with respect to HSMs 130 may be implemented by circuitry in nodes 120.

Network 100, in some embodiments, is a local area network (LAN) configured to communicate network traffic among nodes 120. In various embodiments, network traffic is routed among nodes 120 by switches 110. Accordingly, switches 110 may be configured to queue received messages (i.e., data frames) from nodes 120 and analyze the source and destination addresses specified by the frames in order to appropriately send the messages on to their specified destinations. In some embodiments, switches 110 are configured to route data frames in accordance with IEEE 802.3 (i.e., Ethernet Frames); however, in other embodiments, other networking protocols may be supported.

Nodes 120 may correspond to any suitable devices configured to communicate over a network. In some embodiments, nodes 120 may be devices within a home or office network such as desktop and laptop computers, mobile devices, smart television, smart appliances, etc. In some embodiments, nodes 120 are machines within a fabrication plant that are configured to perform various operations. In some embodiments, nodes 120 are electronic control units (ECUs) in a vehicle such as an aircraft, boat, automobile, recreational vehicle, etc. As used herein, the term "electronic control unit (ECU)" is to be interpreted according to its understood meaning in the art, and includes an embedded system (e.g., microcontroller) that controls one or more operations of a vehicle. In some embodiments, nodes 120 may include, for example, a motor ECU that communicates torque-control messages and wheel-speed messages in order to control operation of a motor, a brake-system ECU that communicates brake control messages in order to apply braking, a LIDAR ECU that processes data received from one or more LIDAR sensors, a flight yoke ECU that communicates angles of the yoke controls, etc.

In various embodiments, nodes 120 (and switch 110) are configured to use synchronized time for various purposes, including coordinating communication of traffic over network 100. For example, an ECU receiving streams from multiple LIDAR sensors may generate a holistic view of a vehicle's surroundings that is dependent on synchronized time among the ECU and its sensors delivering the streams. That is, first and second LIDAR sensors may timestamp their respective streams so that the ECU can determine what every sensor is viewing at a given time. If these timestamps are generated by unsynchronized clocks, the ECU might have a problem determining whether an object is present in front of the vehicle when one LIDAR sensor is indicating the presence of the object while another sensor gives the appearance that nothing is present in front of the vehicle because it included the wrong timestamp. As another example, in some embodiments, traffic communicated over network 100 is coordinated in accordance with a schedule that indicates when particular nodes 120 are supposed to communicate particular traffic. If time is not synchronized across nodes 120, node 120A might begin communicating network traffic during a time slot allocated to node 120B, for example. This collision could result in a node getting the wrong information or significantly delayed information, which may be associated with a time-critical task.

Hardware security modules (HSMs) 130, in one embodiment, are secure circuits configured to provide time information 134 to nodes 120 for various purposes. In some embodiments, each HSM 130 includes a local clock 132 configured to maintain a value of the local time at that node 120, which is synchronized with network clock 142 by the HSM 130. As will be described below in greater detail, in various embodiments, time synchronization for network 100 may be performed such that a given HSM 130 synchronizes its local clock 132 with a neighboring node 120's or switch 110's HSM 130 that resides on the path between the given HSM 130 and grand master 140, and is a hop closer to grand master 140. Accordingly, HSMs 130A and HSMs 130B may synchronize their local clocks 132A and 132B with local clock 132D in HSM 130D being coupled to a node 120 one hop closer to node 120C and grand master 140. HSM 130D, in turn, may synchronize with network clock 142 in grand master 140 as there are no other closer nodes 120 in FIG. 1. Said differently, time synchronization of network 100 may be viewed as a tree structure in which a given child node synchronizes with its parent node, and grand master 140 functions as the root node in the tree structure.

When synchronization between clocks of two HSMs 130 is performed, the HSM 130 providing the timing information (e.g., HSM 130D) may be referred to as the master while HSM 130 receiving the timing information (e.g., HSMs 130A and 130B) may be referred to as the slave. As part of performing a synchronization, in various embodiments, a slave may determine a propagation delay between it and its master (e.g., the delay between HSM 130A and HSM 130D). The slave may also determine an offset between its local clock 132 and master's clock (e.g., the offset between clocks 132A and 132D). Once these values have been determined, the HSM 130 may then provide time information 134 to its node 120, where the timing information includes a time value associated with the current value of network clock 142 and is calculated based on the value of local clock 132, the propagation delay, and the determined offset. In various embodiments, HSMs 130 are relied on for maintaining local time and synchronizing time (as opposed to nodes 120) as HSMs 130 may employ various security techniques making them more secure than nodes 120 as will be described below with respect to FIG. 2.

Grand master (GM) 140, in one embodiment, is a circuit configured to maintain network time for network 100—i.e., the reference time to which local clocks 132 are synchronized. That is, while HSM 130D may act as a master to HSM 130A and HSM 130B, GM 140 is the ultimate authority (i.e., "grand master") in the illustrated embodiment. As noted above, in the illustrated embodiment, GM 140 includes a network clock 142 configured to track the current value of network time. In some embodiments, GM 140 may be one of several master clocks and is selected as the grand master through an election process. As noted above, in some embodiments, GM 140 may be coupled to switch 110 (as opposed to node 120E as shown in FIG. 1) and/or may implement functionality of an HSM 130 discussed below. In various embodiments, GM 140 is also configured to facilitate time synchronization with HSM 130D via synchronization (sync) communications 152 and propagation delay (Pdelay) exchanges 154. (Although communications 152 and exchanges 154 are shown only between GM 140 and HSM 130D in FIG. 1 to simplify the diagram, communications 152 and exchanges 154 are also provided from HSM 130D to HSMs 130A and 130B as well.)

Sync communications 152, in the illustrated embodiment, are messages communicated by a master (e.g., GM 140 or HSM 130D) to announce the current value of network time as identified by its synchronized clock 132 or network clock 142. In various embodiments, a given sync communication 152 includes a timestamp identifying the current value of network time when a sync communication 152 is sent from the master and is usable by a given slave to determine the offset (i.e., difference) between the slave's local clock 132 and the master's clock 132 or clock 142. In various embodiments, the determined offset is both 1) the time difference between the master's clock and the slave's clock and 2) the frequency difference between master's clock and the slave's clock as they may have slightly different frequencies in some instances. Sync communications 152 may be sent on a periodic basis (e.g., eight times a second) as the individual frequencies of clocks 132 and 142 fluctuate with temperature changes. In some embodiments, a given sync communication 152 includes two messages: a sync message (discussed below with FIG. 3A) that is sent at a particular time and a follow up message (discussed below with FIG. 3B) that includes a timestamp specifying the value of network time at the particular time—i.e., the time at which the sync message was sent. In some embodiments, these messages include the content of IEEE 802.1AS frames.

Pdelay exchanges 154, in the illustrated embodiment, are an exchange between a master and slave in order to determine a propagation delay between the master and slave. That is, because it takes time for a message to traverse network 100, a timestamp specified in a sync communication 152 is delayed by the time it arrives at an HSM 130. To account for this, the HSM 130 determines the propagation delay and residence time to appropriately adjust the timestamp in the sync communication 152 so that it accurately reflects the current network time. In some embodiments, an exchange 154 includes a slave sending a message to a master (referred to below and in FIG. 4A as a Pdelay request) and receiving a corresponding response from the master (referred to below and in FIG. 4B as a Pdelay response). The propagation delay may then be determined by 1) calculating the difference between the arrival time of the first message and its departure time, 2) calculating the difference between the arrival time of the second message and its departure time, and 3) determining an average of the differences. Notably, the arrival and departure times of both messages are used in order to account for the fact that the arrival and departure timestamps are supplied by the master's clock and the slave's clock, which may be unsynchronized as noted above. For example, HSM 130D may record the departure time of the first message and the arrival time of the second message based on local clock 132D, but rely on GM 140 to provide timestamps for the arrival time of the first message and the departure time of the second message, which are based on network clock 142. In some embodiments, the second message may include both of these timestamps. In other embodiments, the second message includes the timestamp for the arrival time of the first message, and a third message (referred to below and in FIG. 4C as Pdelay follow-up) is sent that specifies the timestamp for the departure time of the second message. In some embodiments, Pdelay exchanges 154 are performed periodically (e.g., once per second) as the propagation delays may change as the temperature of links 112 and 122 change. In some embodiments, messages communicated in an exchange 154 include the content of IEEE 802.1AS frames.

To improve the security of sync communications 152 and Pdelay exchanges 154, in various embodiments, HSMs 130 and GM 140 are configured to perform various techniques to make them more resistant to tampering by a malicious entity. In some instances, these techniques may protect an HSM 130 if node 120 becomes compromised and begins spoofing that HSM 130's master or GM 140 by broadcasting its own sync communications 152. These techniques may also protect against man-in-the-middle attacks such as switch 110 becoming compromised and attempting to replay messages from an old sync communication 152 or Pdelay exchange 154.

First, in some embodiments, an integrity check values (ICV) is added to one or more messages sent between GM 140 and HSMs 130 during sync communication 152 and a Pdelay exchange 154. This ICV may be calculated using any of various algorithms. For example, in one embodiment, GM 140 and HSMs 130 are configured to calculate ICVs using a message authentication code (MAC) algorithm such as the Hash-based MAC (HMAC) algorithm. In another embodiment, ICVs are digital signatures calculated using the Digital Signature Algorithm (DSA). In still another embodiment, ICVs include a MAC encrypted using the Advanced Encrypted Standard (AES) in cipher block chaining (CBC) mode. In some embodiments, the key used to determine the ICV is unique to a given HSM 130 participating in the communication and known to that HSM 130 and its master. For example, if HSM 130D is sending a first message to HSM 130A and a second message to HSM 130B, the ICV in the first message is calculated using a first key, and the ICV in the second message is calculated using a second key different from the first key. As a result, HSM 130A and 130B may be able to verify not only the integrity of a received message, but also authenticate the message because HSM 130D is the only other entity with the key unique to that HSM 130. Accordingly, if an HSM 130 receives a message including an ICV and is unable to determine that the ICV is valid, the message is suspect and may be disregarded by the HSM 130. In doing so, HSMs 130 and GM 140 may protect against an entity attempting to spoof messages from GM 140 or a particular HSM 130. Examples of messages including an ICV are discussed below with respect to FIGS. 3A-5.

Second, in some embodiments, an HSM 130 is configured to provide a nonce during a Pdelay exchange 154, which is repeated by its master during one or more subsequent sync communications 152. (In some embodiments, the master may also include an additional nonce in the exchange as will be discussed with FIG. 7B.) In doing so, HSM 130 and GM 140 may prevent a malicious entity from replaying sync communications 152 sent prior to providing the nonce as they would lack the nonce. Accordingly, if the HSM 130 receives a sync communication 152 including a nonce that is different from the earlier provided one, the HSM 130 may disregard the communication 152 as suspect. Examples of messages including a nonce are discussed below with respect to FIGS. 3A, 3B, 4A, and 6.

Third, in some embodiments, HSMs 130 are configured to determine an expected offset during a Pdelay exchange 154 and use the expected offset to perform a bounds check on an offset calculated from a given sync communication 152 in order to determine whether that sync communication 152 is valid. Although a Pdelay exchange 154 is performed primarily to determine a propagation delay as noted above, it is possible to determine an offset between a master's clock and a slave's clock from information obtained in determining the delay. In particular, this offset may be determined by 1) calculating an average of the first message's departure time and the second message's arrival time, 2) calculating an average of the first message's arrival time and the second message's departure time, 3) determining the difference between the two averages such that the difference is the offset. In such an embodiment, HSM 130 is configured to determine this offset and compare it against an offset calculated based on a timestamp included in a subsequent sync communicate 152. If the calculated offset differs from what was expected by more than a particular threshold, the timestamp included in the sync communication 152 is suspect. As a result, an HSM 130 may disregard the sync communication 152 and not attempt to provide time information 134 based on the suspect timestamp. In doing so, HSMs 130 may protect against spoofing and/or a man-inthe-middle attack. An example of a method for performing a bounds check is described in greater detail with respect to FIG. 8.

Turning now to FIG. 2, a block diagram of an HSM 130 is depicted. As noted above, in some embodiments, HSMs 130 are used for timing keeping and synchronization in lieu of nodes 120 because HSMs 130 may be more secure for the reasons discussed below. As also noted, in some embodiments, GM 140 may implement functionality described with respect to HSM 130 in order to improve GM 140's security. In the illustrated embodiment, HSM 130 includes a network interface 210, one or more processors 220, a read only memory (ROM) 230, local clock 132, a cryptographic accelerator 240, and a key storage 250 coupled together via an interconnect 260. ROM 230 also includes firmware 232. Key storage 250 also includes one or more ICV keys 252. In some embodiments, HSM 130 may include more (or less) components than shown.

Network interface 210, in one embodiment, is configured to facilitate communication with a node 120. Accordingly, interface 210 may perform encoding and decoding data across a link 122, which, in some embodiments, is a serial peripheral interface (SPI) bus. In various embodiments, interface 210 is also configured to isolate internal components 220-250 from an external entity such as node 120, by filtering incoming read and write operations. In some embodiments, HSM 130 presents a limited attack surface by supporting only a small number of commands. For example, in one embodiment, HSM 130 supports a command allowing node 120 to request the current time and a command to provide data for a sync communication 152 or Pdelay exchange 154. If interface 210 receives data from a node 120 that is not a supported command, interface 210 may prevent the data from entering HSM 130. In doing so, HSM 130 prevents, for example, node 120 from being able to access local clock 132 directly.

Processor 220, in one embodiment, is configured to execute program instructions to implement various operations described herein with respect to HSM 130. In some embodiments, processor 220 is hardwired to fetch from a specific address range at boot in order to boot firmware 232 from ROM 230. Notably, because memory 230 is a ROM (as opposed to some other type of memory that can easily be written to), firmware 232 is resistant to modification, and thus, being tampered with. As a result, HSM 130 can be restored to a default, trusted state by merely causing processor 220 to reboot, which, in the illustrated embodiment, can be initiated by asserting reset signal 202. Thus, processor 220 may further serve to isolate components in HSM 130.

Cryptographic accelerator 240, in one embodiment, is circuitry configured to perform cryptographic operations for HSM 130. Cryptographic accelerator 240 may implement any suitable encryption algorithm such as Data Encryption Standard (DES), Advanced Encryption Standard (AES), Rivest Shamir Adleman (RSA), HMAC, etc. In the illustrated embodiment, accelerator 240 is configured to use keys stored in key storage 250, which accelerator 240 may isolate from being accessed by other components of HSM 130. That is, in some embodiments, accelerator 240 may allow an ICV key 252 to be updated by processor 220, but not allow the key 252 to be read from storage 250 by processor 220.

In various embodiments, cryptographic accelerator 240 is configured to use ICV key 252 to verify ICVs included sync communications 152 and Pdelay exchanges 154. Accordingly, accelerator 240 may be configured to receive a message, calculate an ICV using ICV key 252, and compare the calculated ICV with the ICV included in the received message. If the two ICVs do not match, HSM 130 may discard the message rather than use it for calculating time information 134. ICV key 252 may correspond to any suitable algorithm such as those noted above. As noted above, in some embodiments, ICV key 252 is unique to that HSM 130—i.e., no other HSMs 130 include that key 252.

Turning now to FIG. 3A, a diagram of a sync message 300 is depicted. As noted above, sync message 300 is an example of a message that may be included in a sync communication 152. In the illustrated embodiment, message 300 includes a header, a reserved portion (shown as "Reserved"), a nonce field (shown as "slaveNonce Type-Length-Value (TLV)"), and an ICV field (shown as "ICV TLV"). While these fields may be any suitable size, in this example, the header, reserved portion, nonce field, and ICV field have sizes of 34, 10, about 10, and about 30 octets, respectively. Notably, in the illustrated embodiment, the ICV field includes the ICV for message 300 as will be discussed with respect to FIG. 5; the nonce field includes a nonce that is repeated back by the master (e.g., GM 140 or HSM 130D in FIG. 1) as will be discussed with respect to FIG. 6. In some embodiments, sync message 300 may include more (or less) elements than shown. In some embodiments, sync message 300 is an IEEE 802.1AS sync frame with the nonce field and ICV field appended to the end of the frame.

Turning now to FIG. 3B, a diagram of a sync follow-up 350 is depicted. As noted above, sync follow-up 350 is an example of another message that may be included in a sync communication 152. In the illustrated embodiment, message 350 includes a header, a timestamp (shown as "preciseOriginTimestamp"), additional metadata about communications 152 (shown as "Follow_UP Information TLV"), a nonce field (shown as "slaveNonce Type-Length-Value (TLV)"), and an ICV field (again shown as "ICV TLV"). While these fields may be any suitable size, in this example, these fields have sizes of 34, 10, 34, about 10, and about 30 octets, respectively. Notably, in the illustrated embodiment, the timestamp indicates the departure time of an earlier sync messages 300—i.e., the value of network time (e.g., as identified network clock 142 or determined based on local clock 132D and the HSMs 130D's determined offset) when the message 300 leaves the master. In some embodiments, message 350 may include more (or less) elements than shown. In some embodiments, message 350 is an IEEE 802.1AS sync follow-up frame with an ICV field appended to the end of the frame.

Turning now to FIG. 4A, diagrams of a Pdelay request 400A and Pdelay request 400B are depicted. As noted above, Pdelay requests 400 are examples of an initial message that may be included in a Pdelay exchange 154 and requests a corresponding response from the master. As shown, message 400A includes a header, two reserved portions (again shown as "Reserved"), a nonce field (again shown as "slaveNonce TLV"), and an ICV field. While these fields may be any suitable size, in this example, these fields have sizes of 34, 10, 10, about 10, and about 30 octets, respectively. Notably, in the illustrated embodiment, the nonce field includes the nonce sent by HSM 130 for later inclusion in a sync message 300 and/or sync follow-up message 350. In some embodiments, message 400A may include more (or less) elements than shown. Accordingly, as shown in request 400B, the ICV field may be omitted. In some embodiments, messages 400 are an IEEE 802.1AS Pdelay Request frame with a nonce field and/or an ICV field appended to the end of the frame.

Figure 4B:
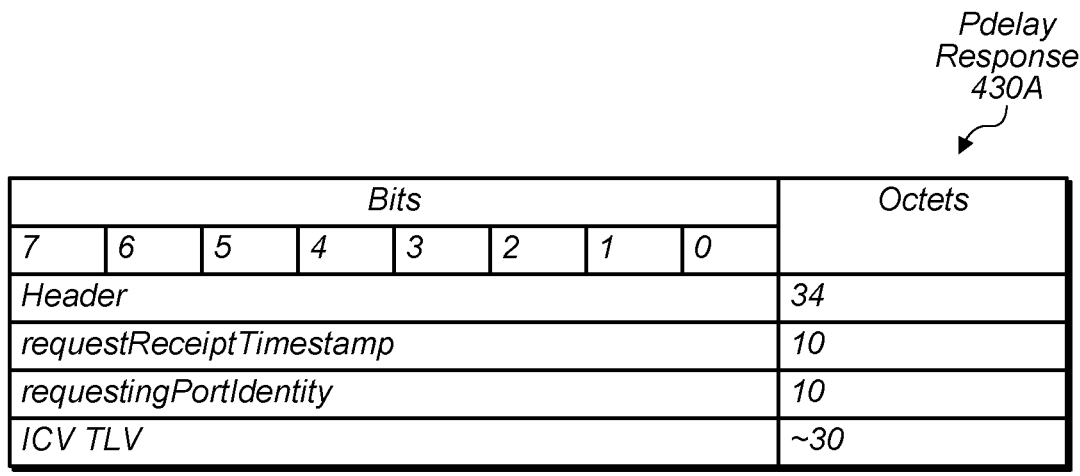
Figure 4B:
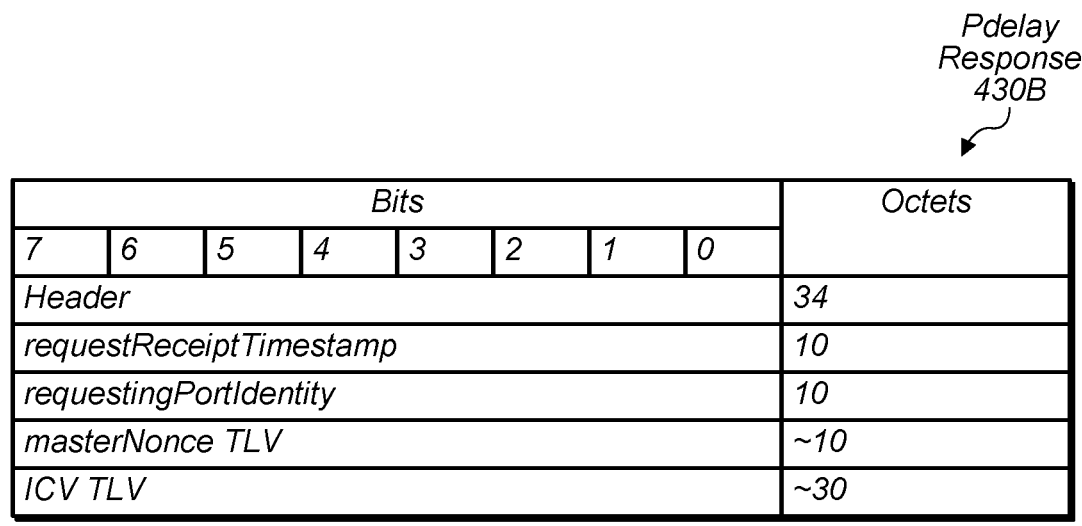

Turning now to FIG. 4B, diagrams of a Pdelay response 430A and Pdelay response 430B are depicted. As noted above, Pdelay responses 430 are examples of another message that may be included in a Pdelay exchange 154 and is a response to a Pdelay Request 400. As shown, message 430A includes a header, a timestamp (shown as "requestReceiptTimestamp"), a port number field identifying a port of a requesting HSM 130 (shown as "requestingPortIdentity"), and an ICV field (again shown as "ICV TLV"). While these fields may be any suitable size, in this example, these fields have sizes of 34, 10, 10, and about 30 octets, respectively. Notably, in the illustrated embodiment, the timestamp indicates the arrival time of an earlier Pdelay Request 400—i.e., the value of network time when the message 400 is received at GM 140. In some embodiments, message 430A may include more (or less) elements than shown. Accordingly, as shown in response 430B, another nonce (shown as "masterNonce TLV") may be included by the master sending response 430B. As will be described below with respect to FIGS. 4C and 7B, this additional nonce may be used to validate a response 430 when it is later included in a follow-up message along with the original nonce supplied by the slave in a request 400. In some embodiments, messages 430 are an IEEE 802.1AS Pdelay response frame with an ICV field and/or master-supplied nonce appended to the end of the frame.

Turning now to FIG. 4C, diagrams of a Pdelay follow-up 460A and Pdelay follow-up 460B are depicted. As noted above, Pdelay follow-ups 460 are examples of another message that may be included in a Pdelay exchange 154 and includes additional information about an earlier Pdelay response 430. As shown, message 460A includes a header, a timestamp (shown as "responseOriginTimestamp"), a port number field identifying a port of a requesting HSM 130 (shown as "requestingPortIdentity"), and an ICV field (again shown as "ICV TLV"). While these fields may be any suitable size, in this example, these fields have sizes of 34, 10, 10, and about 30 octets, respectively. Notably, in the illustrated embodiment, the timestamp indicates the departure time of a Pdelay response 430—i.e., the value of network time when the message 430 leaves the master. In some embodiments, message 460 may include more (or less) elements than shown. Accordingly, as shown in follow-up 460B, a first nonce (shown as "slaveNonce TLV") and a second nonce (shown as "masterNonce TLV") may be included. In such an embodiment, the first nonce corresponds to the nonce included by the slave in a request 400; the second nonce corresponds to the nonce included by the master in response 430B. As will be described with FIG. 7B, the second, master-supplied nonce may be included to establish an association with the first, slave-supplied nonce. Upon confirming this association, a slave HSM 130 may validate an earlier received response 430B by confirming that the master-supplied nonce in the messages 430B matches the second nonce in the follow-up 460B. In some embodiments, messages 460 are an IEEE 802.1AS Pdelay follow-up frame with an ICV field, slave-supplied nonce, and/or master-supplied nonce appended to the end of the frame.

Figure 5:
FIG. 5 is a diagram illustrating an example of an integrity check value field included in one or more of the messages.

Turning now to FIG. 5, a diagram of ICV field 500 is depicted. As noted above, ICV field 500 includes the ICV for messages 300-460. In the illustrated embodiment, field 500 additionally includes an identifier of field 500's type (shown as "tlvType"), the length of field 500 (shown as "lengthField"), a lifetime field indicating how long field 500 is valid (shown as "lifetimeId"), a replay counter indicating a number of links 112 that may be traversed (shown as "replayCounter"), an identifier of an ICV key 252 (shown as "keyId"), an identifier of algorithm used to produce the ICV (shown as "algorithmId"), a reserved field, a padding field, and the ICV. In some embodiments, ICV field 500 may include more (or less) elements than shown.

Figure 6:
FIG. 6 is a diagram illustrating an example of a nonce field included in one or more of the messages.

Turning now to FIG. 6, a diagram of nonce field 600 is depicted. As noted above, nonce field 600 includes the nonce in messages 300 and 400. In the illustrated embodiment, field 600 additionally includes an identifier of field 600's type (shown as "tlvType"), the length of field 600 (shown as "lengthField"), a number indicating the number of nonces used since some initial state (shown "nonceCount"), and the nonce (shown as "slaveNonce"). In some embodiments, ICV field 600 may include more (or less) elements than shown.

Figure 7A:
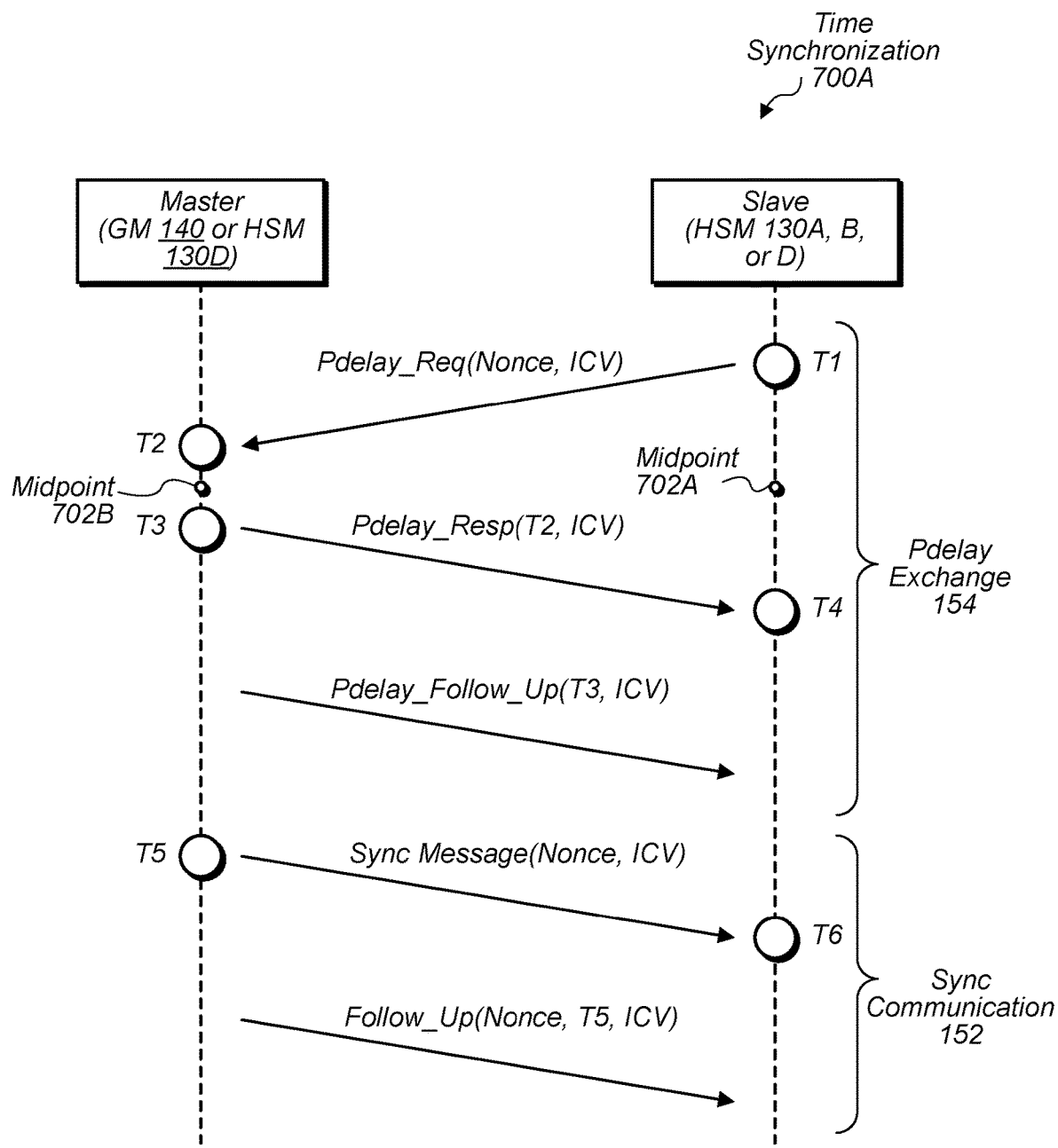
FIGS. 7A and 7B are communication diagrams illustrating examples of a time synchronization that includes a propagation delay exchange and a synchronization communication.

Turning now to FIG. 7A, a communication diagram of a time synchronization 700A between a master (e.g., GM 140 or HSM130D in FIG. 1) and a slave (e.g., HSM 130A, B, or D in FIG. 1) is depicted. In the illustrated embodiment, synchronization 700A includes a Pdelay exchange 154 to determine a propagation delay followed by a sync communication 152 to determine an offset between the master's clock adjusted to network time and the slave's clock. In some embodiments, synchronization 700A may include additional performances of communication 152 before synchronization 700A is repeated.

As shown, the Pdelay exchange 154 may begin at time T1 the departure of a Pdelay request 400A including a nonce and an ICV from the slave to the master. The slave may also store a timestamp for T1 (as indicated by clock 132). At time T2, the request 400A arrives at the master, which validates the ICV for the request 400A and stores the nonce for subsequent inclusion in the sync communication 152. At time T3, the master sends a Pdelay response 430A including a timestamp for T2 (as indicated by clock 142) and an ICV to the slave. At time T4, response 430A arrives at the slave, which confirms the ICV and stores a timestamp for T4. Subsequently, a Pdelay follow-up 460A including a timestamp for T3 arrives at the slave, which validates the ICV. The slave may then determine the propagation delay by calculating an average of the difference between T4 and T3 and the difference between T2 and T1.

As shown, the sync communication 152 may begin at time T5 with the master sending a sync message 300 including a nonce and an ICV to the slave. At time T6, sync message 300 arrives at the slave, which determines whether the message 300 is valid by verifying the ICV and confirming that the nonce included in message 300 matches the earlier nonce included in the Pdelay request 400A. In some embodiments, the slave determines whether a match exists by comparing the nonces. In another embodiment, the slave determines whether a match exists by comparing checksums generated based on the nonces—in some embodiments, these checksums may be included in one or more messages 400A, 300, and 350 in lieu of (or in addition to) including the nonces. Subsequently, the master sends a sync follow-up 350 including a timestamp for T5 and a copy of the earlier nonce to the slave, which validates the nonce and ICV. If both the sync message 300 and the follow-up 350 are valid, the slave calculates the offset between the master's clock adjusted to network time and its clock, by adjusting the timestamp for T5 based on the earlier determined propagation delay and determining the difference between a timestamp for T6 and the adjusted timestamp for T5.

Before using the determined offset to calculate network time from local clock 132, in various embodiments, the slave further performs a bounds check by comparing the calculated offset against another offset (e.g., an "expected" offset) calculated from the timestamps identifying T1-T4. In various embodiments, the slave calculates this expected offset by 1) determining midpoint 702A (the average of T1 and T4) and midpoint 702B (the average of T2 and T3), and 2) determining the difference between midpoints 702A and 702B to produce the expected offset. If the expected offset differs from the offset calculated from the sync communication 152 by more than a threshold value (the distance between T1 and midpoint 702A in some embodiments), the offset calculated from the sync communication 152 is suspect and may be discarded. If, however, the difference between offsets is less (or equal to) the threshold, the slave may proceed to determine network time based on the value of local clock 132 and the offset calculated from the sync communication 152, and may provide this determined network time as time information 134 to a node 120.

Figure 7B:
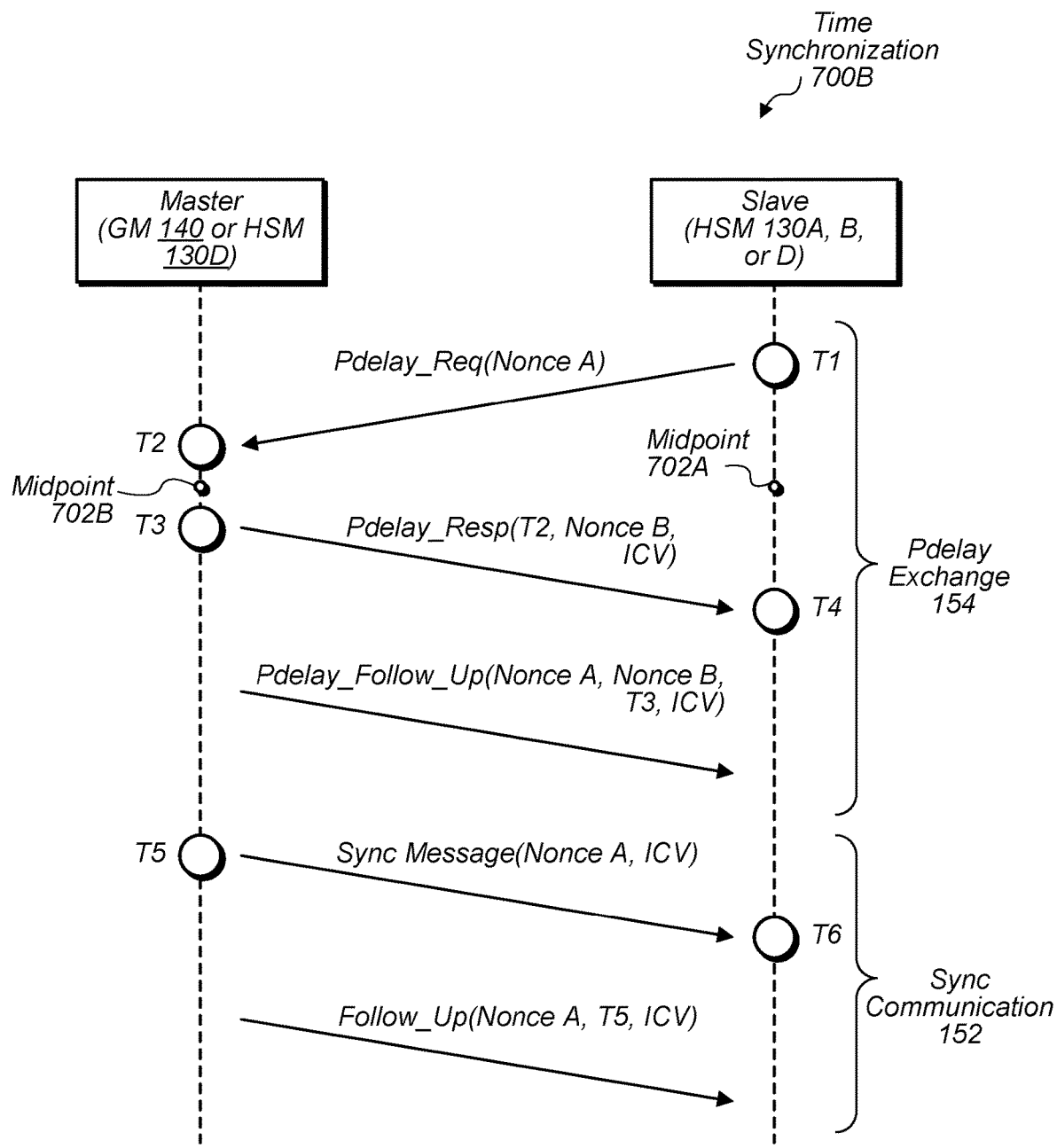

Turning now to FIG. 7B, a communication diagram of another example of a time synchronization 700B between a master (e.g., GM 140 or HSM130D) and a slave (e.g., HSM 130A, B, or D) is depicted. In the illustrated embodiment, synchronization 700B includes a Pdelay exchange 154 followed by a sync communication 152. Notably, synchronization 700B is similar to synchronization 700A, but differs in its use of nonces.

As shown, synchronization may begin at time T1 with a slave sending a Pdelay request 400B including a first nonce (shown as Nonce A), which arrives at the master at T2. At T3, the master sends a response 430B that includes a timestamp for T2 and a second nonce (shown as Nonce B), which is received at T4. The master then sends a follow-up 460B to the response 430B, the follow-up 460B including both the first nonce and the second nonce as well as a timestamp for T3. By including the first nonce and the second nonce in the follow-up 460B, the master establishes an association of the second nonce with the first nonce. Based on this association, the slave can then determine whether the earlier received response 430B is valid by comparing the second nonce in the response 430B with the second nonce in the follow-up 460 (which may include comparing the nonces or checksums generated based on the nonces as discussed above). In other words, associating the first nonce and the second nonce in this manner allows an earlier message to later be validated even if the master is unable to include the first nonce due to timing constraints. Being able to validate this earlier message, in turn, prevents a malicious entity from replaying an older response 430B with some other nonce.

As shown, synchronization 700B may proceed, after validation of messages 430B and 460B have been validated, as discussed in synchronization 700A with the sending of a sync message 300 and a follow-up message 350, which both include the first nonce for validating messages 300 and 350.

Figure 8:
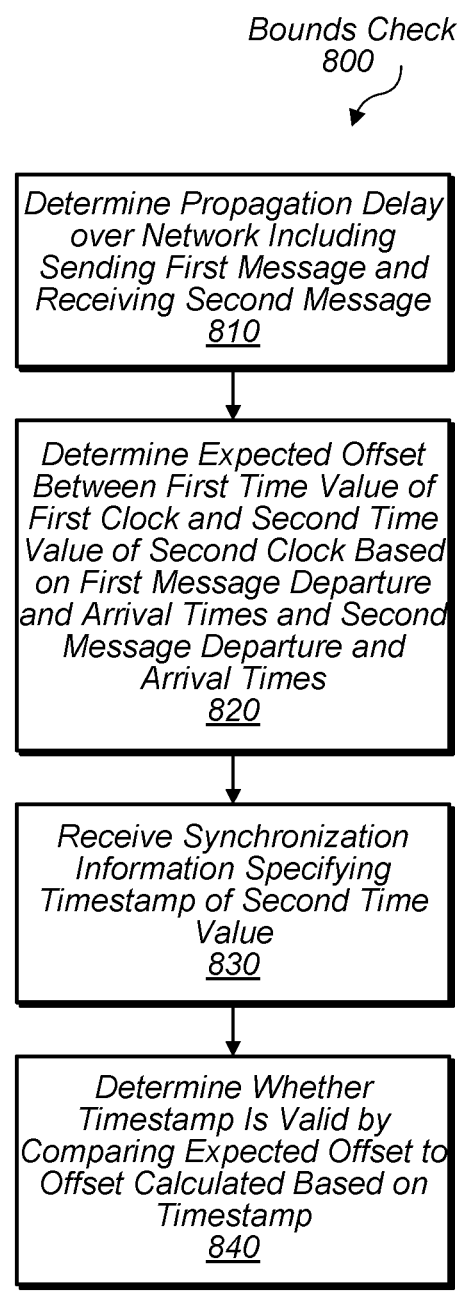
FIG. 8 is a flow diagram illustrating an example of a bounds check for a synchronization communication.

Turning now to FIG. 8, a flow diagram of a bounds check 800 is depicted. Bounds check 800 is one example of a method for checking the bounds of an offset determined from a timestamp in a synchronization message such as sync follow-up 350 discussed above. In various embodiments, bounds check 800 is performed by an apparatus having a first clock circuit (e.g., local clock 132) configured to maintain a first time value for coordinating traffic on a network and synchronization circuit such as HSM 130. In such an embodiment, the apparatus performing check 800 may be acting as a slave attempting to synchronize with a corresponding master.

In step 810, the synchronization circuit determines a propagation delay over the network for receiving synchronization information associated with a second clock circuit (e.g., network clock 142) that maintains a second time value. In such an embodiment, step 810 includes the synchronization circuit sending a first message (e.g., Pdelay request 400) over the network and receiving a second message (e.g., Pdelay response 430) over the network.

In step 820, the synchronization circuit determines an expected offset between the first time value and the second time value based on departure and arrival times of the first message (e.g., times T1 and T2) and departure and arrival times of the second message (e.g., times T3 and T4). In some embodiments, step 820 includes calculating a first average (e.g., midpoint 702B) between the arrival time of the first message and the departure time of the second messages, calculating a second average (e.g., midpoint 702A) between the departure time of the first message and the arrival time of the second message, and determining a difference between the first average and the second average, the expected offset being the difference. In some embodiments, the synchronization circuit stores the departure time of the first message and the arrival time of the second message, and receives the arrival time of the first message (e.g., Pdelay response 430) within the second message, receives a third message (e.g., Pdelay follow-up 460) that includes the departure time of the second message.

In step 830, the synchronization circuit receives synchronization information (e.g., sync communication 152) specifying a timestamp of the second time value. In some embodiments, the received synchronization information includes a third message (e.g., sync follow-up 350) that specifies the timestamp and an integrity check value of the third message. In such an embodiment, step 830 includes using the integrity check value to validate the third message. In some embodiments, the received synchronization information includes a fourth message (e.g., sync messages 300) that includes a nonce, and step 830 includes the synchronization circuit validating the received synchronization information by comparing the nonce with a nonce sent in the first message. In some embodiments, the nonce in the second frame is included in a field (e.g., nonce field 600) appended to the end of the second frame with an integrity check value field (e.g., ICV field 500).

In step 840, the synchronization circuit determines whether the timestamp is valid by comparing the expected offset to an offset calculated based on the timestamp. In some embodiments, an electronic control unit (ECU) communicates network traffic on the network based on the first time value and the calculated offset.

Figures 9A, 9B:
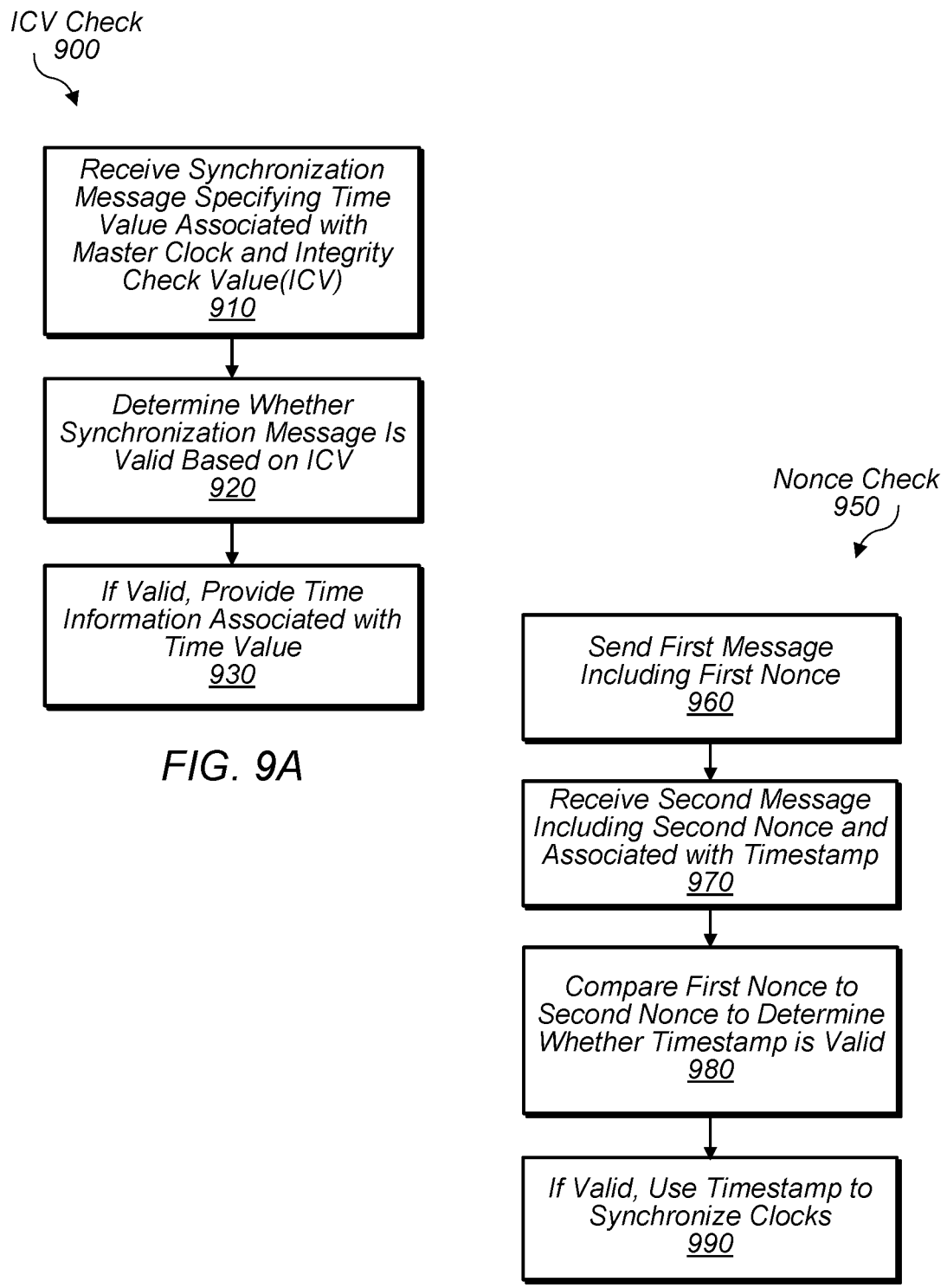
FIGS. 9A and 9B are flow diagrams illustrating examples of other methods that may be performed by network components.

Turning now to FIG. 9A, a flow diagram of an ICV check 900 is depicted. ICV check 900 is one example of a method for checking an ICV found in a synchronization messages such as sync follow-up 350 discussed above. Although described below with respect to synchronization messages, other embodiments of ICV check 900 may be performed with respect to other messages including an ICV. In various embodiments, ICV check 900 is performed by a recipient of a message that includes the ICV such as HSM 130; however, a corresponding method is also contemplated for a sender that generates the frame including the ICV.

Check 900 beings, in step 910, with a secure circuit receiving a synchronization message (e.g., sync follow-up 350) specifying a time value associated with a master clock (e.g., network clock 142) and an integrity check value for the message. In some embodiments, an ECU is configured to communicate traffic over a network in accordance with the master clock for the network. In various embodiments, a network node includes the master clock, and is configured to calculate the integrity check value using a key that is unique to the secure circuit. In step 920, the secure circuit determines whether the synchronization message is valid based on the integrity check value. In step 930, the secure circuit provides, in response to determining that the synchronization message is valid, time information (e.g., time info. 134) associated with the time value to the ECU.

In some embodiments, check 900 also includes determining a propagation delay between the secure circuit and a sender of the synchronization message by sending a first message (e.g., Pdelay request 400) asking for a response and receiving a second message (e.g., Pdelay response 430) including the response. In such an embodiment, the first message and the second messages include integrity check values. In various embodiments, the time information, in step 930, is determined based on the propagation delay and the time value of the master clock. In some embodiments, the integrity check values are appended to ends of the first and second messages (e.g., in ICV TLVs as shown FIGS. 4A and 4B). In some embodiments, the secure circuit calculates an offset based on a departure time of the first message and an arrival time of the second message, and determine whether the synchronization message is valid based on a comparison between the offset and an offset calculated based on the time value.

Turning now to FIG. 9B, a flow diagram of a nonce check 950 is depicted. Nonce check 950 is one example of a method for checking a nonce found in multiple frames such as Pdelay request 400 and sync follow-up 350 discussed above. In various embodiments, nonce check 950 is performed by a slave attempting to synchronize its clock with a master's clock; however, a corresponding method is also contemplated for a master that receives the nonce and inserts it into another frame.

In step 960, a first circuit sends, to a second circuit, a first message (e.g., Pdelay Request 400) that includes a first nonce. In such an embodiment, the first circuit has a first clock (e.g., local clock 132) configured to maintain a local time value for a communication node coupled to a network, and the second circuit has a second clock (e.g., network clock 142) that maintains a network time value for the network. In some embodiments, the first message is sent during an exchange with the second circuit to determine a propagation delay between the first circuit and the second circuit.

In step 970, the first circuit receives, from the second circuit, a second message (e.g., sync message 300) that includes a second nonce (e.g., slaveNonce TLV in sync message 300) and is associated with a timestamp (e.g., preciseOriginTimestamp in FIG. 3B) identifying the network time value. In some embodiments, step 970 includes receiving, from the second circuit, a follow-up message to the second message such that the timestamp is included in the follow-up message and indicates the network time value when the second message is sent from the second circuit.

In step 980, the first circuit compares the first nonce to the second nonce to determine whether the timestamp is valid. In some embodiments, the second message includes a cryptographic checksum for the second message, and step 980 includes a cryptographic circuit (e.g., cryptographic accelerator 240) of the first circuit verifying the cryptographic checksum using a key stored in the cryptographic circuit to determine whether the timestamp is valid.

In step 990, the first circuit, in response to determining that the timestamp is valid, uses the timestamp to synchronize the first clock with the second clock. In some embodiments, the first circuit uses the timestamp to synchronize the first clock with the second clock by determining an offset between the first clock and the second clock based on the propagation delay and the timestamp. In some embodiments, step 980 includes 1) calculating an expected offset between the first and second clocks such that the expected offset is calculated based on timing information determined from the exchange discussed with step 960 and 2) validating the determined offset by comparing the determined offset with the expected offset.

Exemplary Computer System

Figure 10:
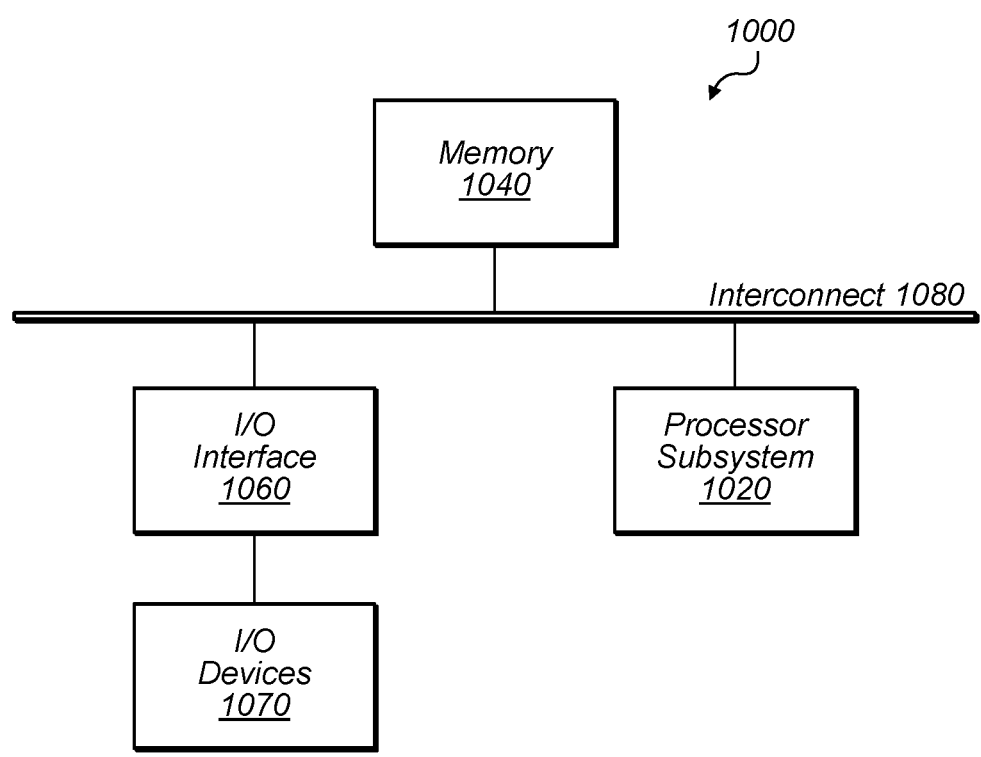
FIG. 10 is a block diagram illustrating an exemplary computer system.

Turning now to FIG. 10, a block diagram of an exemplary computer system 1000 is depicted. Computer system 1000 is one embodiment of a computer system that may be used to implement one or more components of secure network 100 such as nodes 120 or grand master 140. In the illustrated embodiment, computer system 1000 includes a processor subsystem 1020 that is coupled to a system memory 1040 and I/O interfaces(s) 1060 via an interconnect 1080 (e.g., a system bus). I/O interface(s) 1060 is coupled to one or more I/O devices 1070. Computer system 1000 may be any of various types of devices, including, but not limited to, a server system, personal computer system, network computer, an embedded system, etc. Although a single computer system 1000 is shown in FIG. 10 for convenience, system 1000 may also be implemented as two or more computer systems operating together.

Processor subsystem 1020 may include one or more processors or processing units. In various embodiments of computer system 1000, multiple instances of processor subsystem 1020 may be coupled to interconnect 1080. In various embodiments, processor subsystem 1020 (or each processor unit within 1020) may contain a cache or other form of on-board memory.

System memory 1040 is usable store program instructions executable by processor subsystem 1020 to cause system 1000 perform various operations described herein. System memory 1040 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1000 is not limited to primary storage such as memory 1040. Rather, computer system 1000 may also include other forms of storage such as cache memory in processor subsystem 1020 and secondary storage on I/O Devices 1070 (e.g., a hard drive, storage array, etc.). In some embodiments, these other forms of storage may also store program instructions executable by processor subsystem 1020 to perform operations described herein.

I/O interfaces 1060 may be any of various types of interfaces configured to couple to and communicate with other devices, according to various embodiments. In one embodiment, I/O interface 1060 is a bridge chip (e.g., Southbridge) from a front-side to one or more back-side buses. I/O interfaces 1060 may be coupled to one or more I/O devices 1070 via one or more corresponding buses or other interfaces. Examples of I/O devices 1070 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1000 is coupled to a network via a network interface device 1070 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature.

Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a first clock circuit configured to maintain a first time value associated with a network;
   a synchronization circuit configured to:
      determine a propagation delay over the network for receiving synchronization information associated with a second clock circuit that maintains a second time value, wherein determining the propagation delay includes the synchronization circuit sending a first message over the network and receiving a second message over the network;
      determine an expected offset between the first time value and the second time value based on departure and arrival times of the first message and departure and arrival times of the second message;
      receive synchronization information specifying a timestamp of the second time value; and
      determine whether the timestamp is valid by comparing the expected offset to an offset calculated based on the timestamp, wherein determining whether the timestamp is valid includes:
         determining the timestamp is invalid if a difference between the expected offset and the offset calculated based on the timestamp exceeds a particular threshold.

2. The apparatus of claim 1, wherein to determine the expected offset, the synchronization circuit is configured to:
   calculate a first average between the arrival time of the first message and the departure time of the second message;
   calculate a second average between the departure time of the first message and the arrival time of the second message; and
   determine a difference between the first average and the second average, wherein the expected offset is the difference.

3. The apparatus of claim 2, wherein the synchronization circuit is further configured to:
   store the departure time of the first message and the arrival time of the second message;
   receive the arrival time of the first message within the second message; and
   receive a third message that includes the departure time of the second message.

4. The apparatus of claim 1, wherein the received synchronization information includes a third message that specifies the timestamp and an integrity check value of the third message; and
   wherein the synchronization circuit is further configured to use the integrity check value to validate the third message.

5. The apparatus of claim 4, wherein the received synchronization information includes a fourth message that includes a nonce; and
   wherein the synchronization circuit is further configured to validate the received synchronization information by comparing the nonce with a nonce sent in the first message.

6. The apparatus of claim 5, wherein the nonce in the fourth message is included in a field appended to the end of the fourth message with an integrity check value field.

7. The apparatus of claim 1, further comprising an electronic control unit (ECU) configured to communicate network traffic on the network based on the first time value and the calculated offset.

8. A method comprising:
   maintaining, by a first clock circuit, a first time value associated with a network;
   determining, by a synchronization circuit, a propagation delay over the network for receiving synchronization information associated with a second clock circuit that maintains a second time value, wherein determining the propagation delay includes sending a first message over the network and receiving a second message over the network;
   determining, by the synchronization circuit, an expected offset between the first time value and the second time value based on departure and arrival times of the first message and departure and arrival times of the second message;
   receiving, by the synchronization circuit, synchronization information specifying a timestamp of the second time value; and
   determining, by the synchronization circuit, whether the timestamp is valid by comparing the expected offset to an offset calculated based on the timestamp, wherein determining whether the timestamp is valid includes:
      determining the timestamp is invalid if a difference between the expected offset and the offset calculated based on the timestamp exceeds a particular threshold.

9. The method of claim 8, wherein determining the expected offset includes:
   calculating a first average between the arrival time of the first message and the departure time of the second message;
   calculating a second average between the departure time of the first message and the arrival time of the second message; and
   determining a difference between the first average and the second average, wherein the expected offset is the difference.

10. The method of claim 9, further comprising:
    storing the departure time of the first message and the arrival time of the second message;
    receiving the arrival time of the first message within the second message; and
    receiving a third message that includes the departure time of the second message.

11. The method of claim 8, wherein the received synchronization information includes a third message that specifies the timestamp and an integrity check value of the third message; and using the integrity check value to validate the third message.

12. The method of claim 11, wherein the received synchronization information includes a fourth message that includes a nonce; and validating the received synchronization information by comparing the nonce with a nonce sent in the first message.

13. The method of claim 12, wherein the nonce in the fourth message is included in a field appended to the end of the fourth message with an integrity check value field.

14. The method of claim 8, further comprising providing, by the synchronization circuit, the first time value and the calculated offset to an electronic control unit (ECU) that uses the first time value and the calculated offset for communicating network traffic on the network.

15. A non-transitory computer-readable medium having program instructions stored therein that are executable by an apparatus, including a synchronization circuit and a first clock circuit, to cause the apparatus to perform operations comprising:

maintaining a first time value associated with a network;

determining a propagation delay over the network for receiving synchronization information associated with a second clock circuit that maintains a second time value, wherein determining the propagation delay includes sending a first message over the network and receiving a second message over the network;

determining an expected offset between the first time value and the second time value based on departure and arrival times of the first message and departure and arrival times of the second message;

receiving synchronization information specifying a timestamp of the second time value; and determining whether the timestamp is valid by comparing the expected offset to an offset calculated based on the timestamp, wherein determining whether the timestamp is valid includes:

determining the timestamp is invalid if a difference between the expected offset and the offset calculated based on the timestamp exceeds a particular threshold.

16. The computer-readable medium of claim 15, wherein determining the expected offset includes:

calculating a first average between the arrival time of the first message and the departure time of the second message;

calculating a second average between the departure time of the first message and the arrival time of the second message; and determining a difference between the first average and the second average, wherein the expected offset is the difference.

17. The computer-readable medium of claim 16, further comprising:

storing the departure time of the first message and the arrival time of the second message;

receiving the arrival time of the first message within the second message; and receiving a third message that includes the departure time of the second message.

18. The computer-readable medium of claim 15, wherein the received synchronization information includes a third message that specifies the timestamp and an integrity check value of the third message; and using the integrity check value to validate the third message.

19. The computer-readable medium of claim 18, wherein the received synchronization information includes a fourth message that includes a nonce; and validating the received synchronization information by comparing the nonce with a nonce sent in the first message.

20. The computer-readable medium of claim 19, wherein the nonce in the fourth message is included in a field appended to the end of the fourth message with an integrity check value field.

* * * * *